(12) United States Patent
Bircher et al.

(10) Patent No.: US 7,526,578 B2
(45) Date of Patent: Apr. 28, 2009

(54) OPTION ROM CHARACTERIZATION

(75) Inventors: William L. Bircher, Austin, TX (US); Shiva R. Dasari, Austin, TX (US); Wingcheung Tam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 11/356,793

(22) Filed: Feb. 17, 2006

(65) Prior Publication Data

US 2007/0208883 A1  Sep. 6, 2007

(51) Int. Cl.
*G06F 3/00* (2006.01)
*G06F 9/00* (2006.01)
*G06F 9/24* (2006.01)
*G06F 15/177* (2006.01)
*G06F 1/24* (2006.01)

(52) U.S. Cl. .................. 710/10; 713/1; 713/2; 713/100
(58) Field of Classification Search .................... 710/10
See application file for complete search history.

(56) References Cited

U.S. PATENT DOCUMENTS

| | | | |
|---|---|---|---|
| 5,394,514 A | | 2/1995 | Matsubara |
| 5,608,876 A | | 3/1997 | Cohen et al. |
| 5,754,853 A | | 5/1998 | Pearce |
| 5,963,219 A | | 10/1999 | Choi |
| 5,999,989 A | * | 12/1999 | Patel ............................. 710/1 |
| 6,009,540 A | * | 12/1999 | Craft et al. ..................... 714/30 |
| 6,073,206 A | * | 6/2000 | Piwonka et al. ............. 711/102 |
| 6,173,341 B1 | | 1/2001 | Emerson et al. |
| 6,175,932 B1 | | 1/2001 | Foote et al. |
| 6,282,647 B1 | | 8/2001 | Leung et al. |
| 6,425,079 B1 | | 7/2002 | Mahmoud |
| 6,438,689 B1 | * | 8/2002 | Orr et al. ....................... 713/2 |
| 6,513,114 B1 | * | 1/2003 | Wu et al. ....................... 713/2 |
| 6,529,989 B1 | * | 3/2003 | Bashford et al. ............ 710/306 |
| 6,567,911 B1 | * | 5/2003 | Mahmoud ...................... 713/2 |
| 6,725,178 B2 | | 4/2004 | Cheston et al. |
| 7,032,108 B2 | * | 4/2006 | Maynard et al. ................ 713/2 |
| 7,337,240 B2 | * | 2/2008 | Bayer et al. ................. 709/250 |
| 2005/0038986 A1 | * | 2/2005 | Agan et al. ..................... 713/2 |

\* cited by examiner

*Primary Examiner*—Henry W.H. Tsai
*Assistant Examiner*—Michael Sun
(74) *Attorney, Agent, or Firm*—John Biggers; Cynthia G. Seal; Biggers & Ohanian LLP (57) ABSTRACT

Methods, apparatus, and computer program products are disclosed for option ROM characterization by establishing an isolating execution environment for an expansion adapter of a computer, the adapter having an option ROM containing initialization code for the adapter, executing the initialization code for the expansion adapter in the isolating execution environment, identifying operating characteristics of the option ROM, including characteristics of the option ROM unavailable prior to execution of the initialization code in the isolating execution environment, and allocating virtual memory address space in a normal execution environment of the computer to the option ROM of the expansion adapter in dependence upon the identified operating characteristics of the option ROM.

1 Claim, 3 Drawing Sheets

OPTION ROM CHARACTERIZATION

BACKGROUND OF THE INVENTION

1. Field of the Invention

The field of the invention is data processing, or, more specifically, methods, apparatus, and products for option ROM characterization.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. Advances in semiconductor processing and computer architecture push the performance of the computer higher and higher.

Such advances in computer architecture have resulted in a computer system's ability to utilize other computer resources through expansion adapters containing option ROM. Expansion adapters containing option ROM are a valuable tool for expanding the functionality of computer systems. Option ROM allows an expansion card vendor to package initialization code with the adapter. Packaging the initialization code of an expansion adapter greatly simplifies the configuration of the expansion adapter because the expansion adapters are able to configure themselves rather than rely on system firmware.

Some computer architectures, such as the 32-bit x86 architecture developed by Intel, greatly limit the use of option ROM to promote backward compatibility earlier computer architectures. In those early computer architectures, total system computer memory was measured in kilobytes, and the size of a processor's address space was one megabyte. In today's computer architectures, computer memory is measured in gigabytes, and the size of a microprocessor's address space will soon be measured in terabytes. While total system memory and a processor's address space have increased by several orders of magnitude, the range of memory in a processor's memory address space devoted to option ROM has not increased at all. Just as in the early 1980's, the size of the option ROM region in a processor's memory address space remains limited to 128 kilobytes.

When computer architects first implemented option ROM, 128 kilobytes easily contained the option ROM initialization code of all adapters in the system. Since then, adapter functionality has become much more complex, and consequently, the address space required to contain option ROM has also increased. The option ROM of a single expansion bus adapter, such as a Small Computer System Interface ('SCSI') adapter, can take as much as 48 kilobytes to perform initialization of the adapter. That is, an expansion bus adapter may occupy up to 37.5% of the option ROM region of the address space. In addition, the ever increasing number of expansion slots in computer systems compounds the problem of running out of space in the option ROM region of the address space. For example, current computer systems may have up to 18 expansion slots, each slot capable of receiving an expansion adapter containing option ROM that requires initialization. Further compounding the allocation of memory in the option ROM region, many option ROMs request certain address ranges in the option ROM region of the address space. These memory allocation requests may not efficiently utilize the option ROM region because unallocated gaps or holes in the option ROM region may result.

Solutions to the 128 kilobyte limitation for option ROM fall into two categories: offline and online. Offline solutions usually require some user intervention and include building a model of the host system that includes all potential adapters which will be used in that particular system. Due to the complexity of building a model of a computer system that includes all potential adapters, expansion adapter manufacturers and expansion adapter users often experiment by placing a group of expansion adapters in various combinations until a successful allocation in the option ROM region is found. Online solutions are those solutions performed by the system BIOS as part of the boot process. Online techniques are preferred to over offline solutions because online techniques provide an automatic solution and require no modification as new expansion adapters are added to the system.

Three of the most common online techniques are Runtime Space Reduction ('RSR'), Post Memory Manager ('PMM'), and ROM Sharing. RSR is a simple technique implemented in option ROM initialization code that releases address space only needed during initialization and not during runtime. PMM is a recent addition that allows the storage of some option ROM code and data in an address space outside of the typical 128 kilobyte option ROM region. The PMM technique, however, requires support by the option ROM and system BIOS. ROM sharing is implemented in the option ROM code and allows multiple instances of an expansion adapter to share a single option ROM image.

In addition to these specialized techniques, the most advanced system software also implements one or more of the following conventional sorting techniques: First Fit, Last Fit, Next Fit, Best Fit, Worst Fit, Almost Worst Fit, and Almost Best Fit. These conventional sorting techniques, however, are dependent on an accurate characterization of the option ROMs being sorted in order to make an efficient allocation of the option ROM region in the address space. Unfortunately, the most accurate characterization of the option ROM occurs after allocation is complete because before allocation of the option ROM many of the operating characteristics of the option ROM are unknown. For example, runtime size and support of ROM sharing are only available after the option ROM has been allocated and executed.

SUMMARY OF THE INVENTION

Methods, apparatus, and computer program products are disclosed for option ROM characterization by establishing an isolating execution environment for an expansion adapter of a computer, the adapter having an option ROM containing initialization code for the adapter, executing the initialization code for the expansion adapter in the isolating execution environment, identifying operating characteristics of the option ROM, including characteristics of the option ROM unavailable prior to execution of the initialization code in the isolating execution environment, and allocating virtual memory address space in a normal execution environment of the computer to the option ROM of the expansion adapter in dependence upon the identified operating characteristics of the option ROM. Option ROM characterization may include storing a system state of the computer prior to establishing the isolating execution environment and restoring the system state after identifying the operating characteristics of the option ROM. Option ROM characterization may also include allocating virtual address space required by a processor of the computer for input/output functions to the expansion adapter, except for allocation of virtual memory address space to the option ROM of the expansion adapter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Detailed Description

Figure 1:
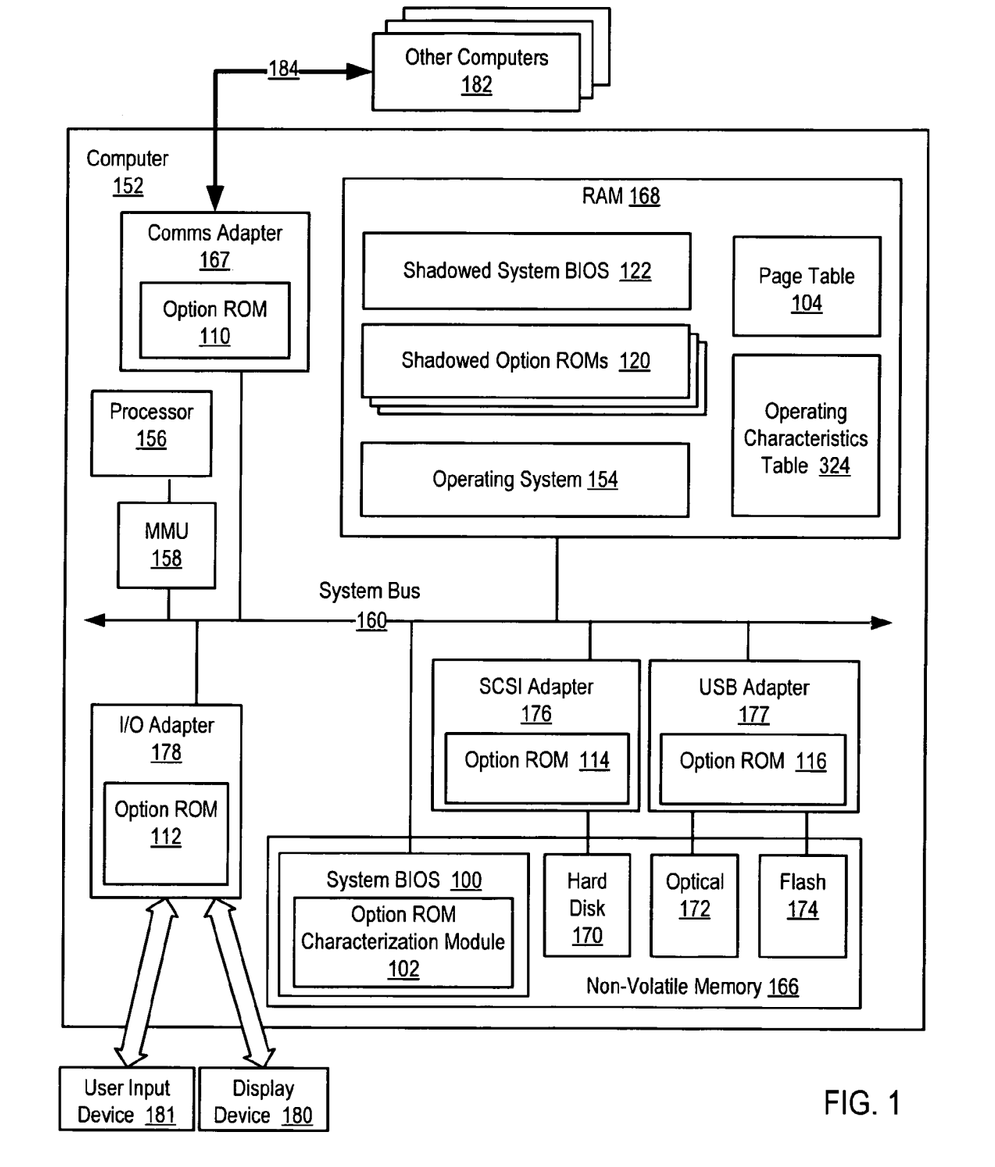
FIG. 1 sets forth a block diagram of automated computing machinery that includes an exemplary computer useful in option ROM characterization according to embodiments of the present invention.

Exemplary methods, apparatus, and products for option ROM characterization according to embodiments of the present invention are described with reference to the accompanying drawings, beginning with FIG. 1. Option ROM characterization in accordance with the present invention is generally implemented with computers, that is, with automated computing machinery. FIG. 1, therefore, sets forth a block diagram of automated computing machinery that includes an exemplary computer (152) useful in option ROM characterization according to embodiments of the present invention. The system of FIG. 1 operates generally for option ROM characterization according to embodiments of the present invention by establishing an isolating execution environment for an expansion adapter of a computer, the adapter having an option ROM containing initialization code for the adapter, executing the initialization code for the expansion adapter in the isolating execution environment, identifying operating characteristics of the option ROM, including characteristics of the option ROM unavailable prior to execution of the initialization code in the isolating execution environment, and allocating virtual memory address space in a normal execution environment of the computer to the option ROM of the expansion adapter in dependence upon the identified operating characteristics of the option ROM. The system of FIG. 1 also operates generally for option ROM characterization according to embodiments of the present invention by storing a system state of the computer prior to establishing the isolating execution environment and restoring the system state after identifying the operating characteristics of the option ROM. The system of FIG. 1 also operates generally for option ROM characterization according to embodiments of the present invention by allocating virtual address space required by a processor of the computer for input/output functions to the expansion adapter, except for allocation of virtual memory address space to the option ROM of the expansion adapter.

An expansion adapter is computer hardware that expands the capabilities of a computer by providing the circuitry to support other devices. For example, video adapters enable the computer to support graphics monitors, and network adapters enable a computer to attach to a network. Expansion adapters may be built directly into the main circuitry of a computer, that is, into the 'motherboard,' but expansion adapters may also be built into separate circuit boards that insert into slots on the motherboard. Such separate circuit boards are referred to as 'expansion boards' or 'daughter cards.'

The system of FIG. 1 includes several computer hardware components operating as expansion adapters. The example computer (152) of FIG. 1 includes a communications adapter (167) connected to the other components of the computer (152) through system bus (160). The communications adapter (167) implements data communications (184) with other computers (182). Such data communications may be carried out serially through RS-232 connections, through external buses such as Universal Serial Bus ('USB'), through data communications networks such as Internet Protocol 'IP' networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

The example computer (152) of FIG. 1 also includes a Small Computer System Interface ('SCSI') adapter (176) connected to the other components of the computer (152) through system bus (160). SCSI is a standard bus protocol for transferring data between a variety of devices on both internal and external computer buses issued by the InterNational Committee for Information Technology Standards ('IN-CITS'). Several varieties of the SCSI standard exist such as, for example, SCSI-1, SCSI-2, SCSI-3, Ultra SCSI, Wide SCSI, and so on. The SCSI adapter (176) provides an interface for other components of computer (152) to utilize SCSI hard disk drive (170).

The example computer (152) of FIG. 1 includes a USB adapter (177) connected to the other components of the computer (152) through system bus (160). USB is a serial bus standard for connecting devices on both internal and external computer buses developed by Hewlett-Packard, Intel, Lucent, Microsoft, NEC, and Philips. The USB adapter (177) provides an interface for other components of computer (152) to utilize optical disk drive (172) and electrically erasable programmable read-only memory space (so-called 'EEPROM' or 'Flash' memory) (174).

The example computer of FIG. 1 also includes one or more input/output interface adapters (178) connected to the other components of the computer (152) through system bus (160). Input/output interface adapters in computers implement user-oriented input/output through, for example, software drivers and computer hardware for controlling output to display devices (180) such as computer display screens, as well as user input from user input devices (181) such as keyboards and mice.

Each expansion adapter (167, 176, 177, 178) in the system of FIG. 1 includes option ROM. Option ROM is firmware that provides an interface to implement operations specific to an expansion adapter such as, for example, a power-on self test ('POST'), initialization, interrupt service routines, and basic input/output ('BIOS') routines. Option ROM may contain several types of firmware such as, for example, initialization code and runtime code. Initialization code is the computer program instructions that initialize an expansion adapter and prepare the expansion adapter for runtime operation. Initialization code may operate by performing the POST of the expansion adapter and mapping the interrupt service routines to an interrupt vector table. Runtime code is computer program instructions that provide the interrupt service routines and BIOS routines after the expansion adapter and other components of the computer have been initialized. Although not all expansion adapters contain option ROM, an expansion adapter usually requires option ROM when system BIOS utilizes the expansion adapter before the operating system loads or when the expansion adapter operates in a manner too complex for system BIOS to control directly. In the example system of FIG. 1, communications adapter (167) includes option ROM (110), SCSI adapter (176) includes option ROM (114), USB adapter (177) includes option ROM (116), and input/output adapter (178) includes option ROM (112).

Although the acronym 'ROM' that is used in the term 'option ROM' stands for 'Read Only Memory,' option ROM is typically implemented using flash memory. The use of the acronym 'ROM' occurs for historical reasons because before 1990, computer designers typically implemented firmware using ROM chips that could not be altered. As the complexity of option ROM and the need to update option ROM grew, computer designers began to implement option ROM using flash memory devices so that firmware remained easily upgradeable. Although the hardware devices used to implement 'option ROM' has evolved, the term 'option ROM' itself remains.

The example computer (152) of FIG. 1 also includes system BIOS (100). System BIOS (100) is firmware that initializes and tests the hardware components of the computer as well as loads, executes, and passes control of computer hardware components over to an operating system. In addition, system BIOS remains in use after the operating system loads to provide the operating system low-level access to certain computer hardware devices. In the example of FIG. 1, system BIOS (100) includes option ROM characterization module (102). The option ROM characterization module (102) is a set of computer program instructions improved for option ROM characterization according to embodiments of the present invention.

The computer (152) of FIG. 1 includes at least one computer processor (156), or 'CPU,' as well as random access memory (168) ('RAM'). Both the computer processor (156) and the RAM (168) connect to other components of the computer through a system bus (160). Stored in RAM (168) is a shadowed system BIOS (122) and shadowed option ROMs (120). The term 'shadowed' indicates that a copy of the object 'shadowed' exists in RAM. Shadowed system BIOS (122) therefore is a copy in RAM of system BIOS (100), and shadowed option ROMs (120) are copies in RAM of option ROMs (110-116). Unless context indicates otherwise, the term 'option ROM' and 'shadowed option ROM' are used interchangeably in this specification. System BIOS (100) typically instructs processor (156) to copy the System BIOS (100) and option ROMs (110-116) into RAM because RAM is generally responds much faster than EEPROM implementing the system BIOS (100) and option ROMs (110-116). Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art.

The computer of FIG. 1 also includes an operating characteristics table (324) stored in RAM (168). The option ROM characterization module (102) stores in the operating characteristics table (324) the operating characteristics of an option ROM of an expansion adapter, including characteristics of an option ROM unavailable prior to execution of the initialization code in an isolating execution environment. Operating characteristics are metrics that describe an option ROM. Operating characteristics may include, for example, runtime size or the availability of support for ROM sharing by the option ROM.

The example computer (152) of FIG. 1 also includes a page table (104) stored in RAM (168). The page table (104) represents a map between a virtual memory address space and a physical address space. The virtual memory address space is the range of addresses addressable by a computer processor. For example, a 16-bit processor has a virtual address space that extends from zero kilobytes ('KB') to 64 KB, while a 32-bit computer processor can have a virtual address space that extends from zero gigabytes ('GB') to 4 GB. The physical address space is the physical addresses of computer hardware components in the example of FIG. 1. The virtual memory address space is broken into fixed-size blocks called 'pages,' while the physical address space is broken into corresponding blocks of the same size called 'frames.' A predetermined number of the most significant bits in a memory address represent the page number of the memory address. The least significant bits represent the page offset of the memory address. When a processor references a memory address in the virtual memory address space, a memory management unit ('MMU') (158) looks up the frame number of the frame of physical addresses in the page table (104) that corresponds to the page of the memory addresses containing the referenced memory address. The MMU (158) then adds the page offset to the frame number to generate a physical address in the physical address space that corresponds to the memory address in the virtual memory address space. Because the page table (104) allows a processor to reference a memory address in the virtual memory address space without regard to where the memory address is mapped in the physical address space, the MMU may map memory addresses in the virtual memory address space to any physical address of devices in the computer. The MMU may, for example, map RAM, ROM, option ROM, or registers of an expansion adapter into the virtual memory address space regardless of the physical addresses of these devices.

The example computer of FIG. 1 also includes an MMU (158). The MMU (158) is a set of computer hardware components responsible for managing memory access requests by the processor (156). The MMU (158) provides translation between the virtual memory address space and the physical address space using page table (104). The page table used by MMU (158) may exist as software in RAM or be implemented in other forms of computer memory such as EEPROM or hardware registers. In addition to providing translation between the virtual memory address space and the physical memory address space, the MMU (158) may also provide memory protection, cache memory control, computer bus arbitration, and bank switching.

Shadowed system BIOS (122), shadowed option ROMs (120), operating characteristics table (324), page table (104), and operating system (154) in the example of FIG. 1 are shown in RAM (168), but many components of such software typically are stored in non-volatile memory (166) also. Computer (152) of FIG. 1 therefore includes non-volatile computer memory (166) coupled through expansion adapters (176, 177) or a system bus (160) to processor (156) and to other components of the computer (152). Non-volatile computer memory (166) may be implemented as a hard disk drive (170), optical disk drive (172), flash memory (174), RAM drives (not shown), or as any other kind of computer memory as will occur to those of skill in the art.

Figure 2:
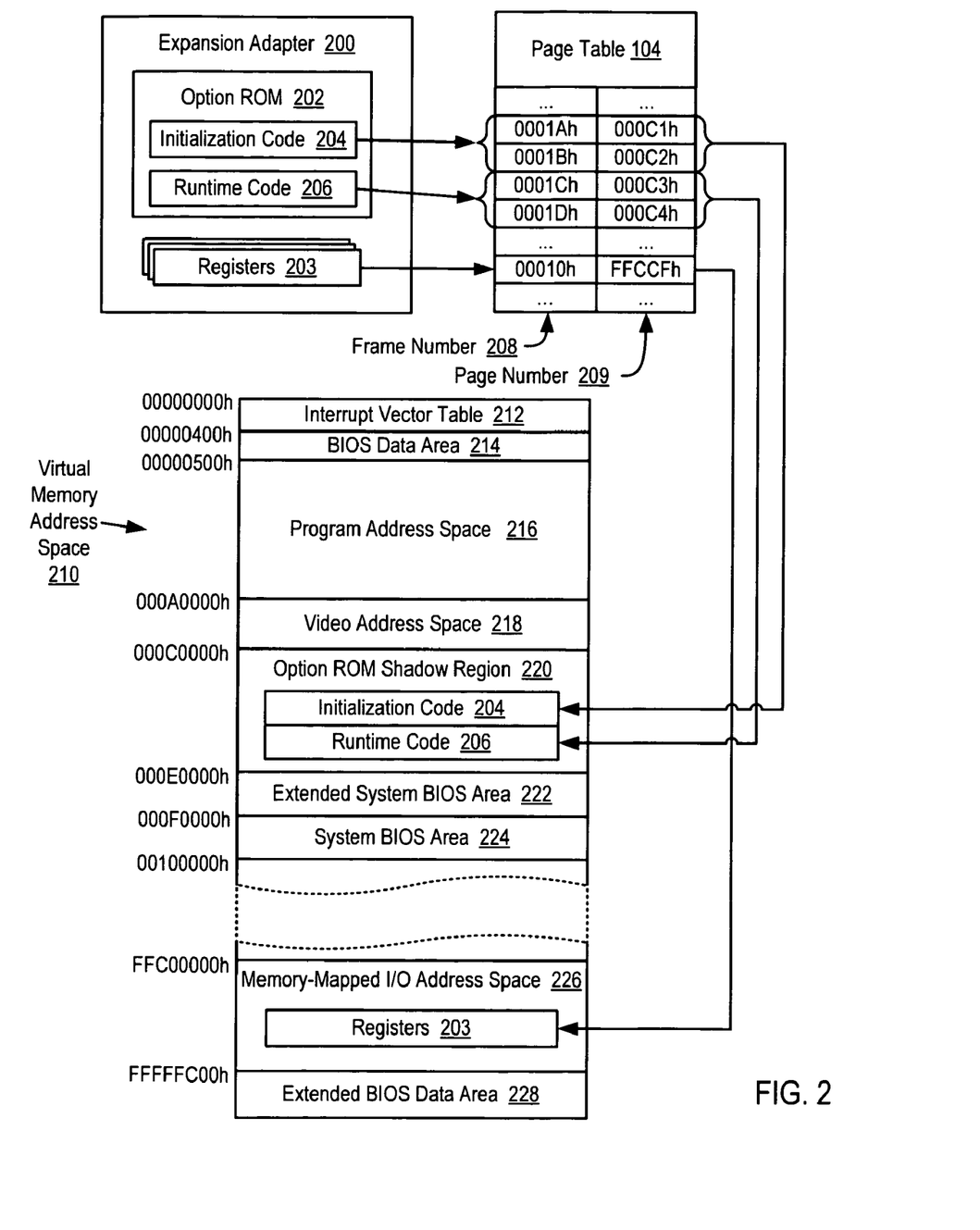
FIG. 2 sets forth a line drawing of an example virtual memory address space, an example expansion adapter, and an example page table useful in option ROM characterization according to embodiments of the present invention.

As explained above, a computer processor accesses computer devices through a virtual address space, while a memory management unit provides for the processor address translation between the virtual address space and the physical address space using a page table. For further explanation, therefore, FIG. 2 sets forth a line drawing of an example virtual memory address space (210), an example expansion adapter (200), and an example page table (104) useful in option ROM characterization according to embodiments of the present invention. In the example of FIG. 2, the virtual memory address space (210) is the range of addresses that are addressable by a computer processor. In the example of FIG. 2, the virtual memory address space extends from '00000000h' to 'FFFFFFFFh' indicating the ability of a 32-bit processor to address an address space up to 4 GB in size. Computer architects typically reserve certain addresses ranges within a virtual memory address space for particular uses.

In the example of FIG. 2, the address range from '00000000h' to '000003FFh' of the virtual memory address space (210) is reserved for an interrupt vector table (212). The interrupt vector table (212) is a range of memory addresses mapped into RAM that contains a table of address pointers to interrupt subroutines. The interrupt vector table (212) consists of 256 4-byte pointers and resides in the first 1 KB of the virtual memory address space (210). Each interrupt number is reserved for a specific purpose. For example, 16 of the interrupt vectors are reserved for the 16 IRQ lines that exist in some computer architectures such as the 'x86' computer architecture developed by Intel.

In the example of FIG. 2, the address range from '00000400h' to '000004FFh' of the virtual memory address space (210) is reserved for a BIOS data area (214). The BIOS data area (214) is a 256 byte range of memory addresses mapped into RAM that are used by BIOS to manage system devices and resources. Information that may be stored in the BIOS data area (214) may include, for example, the number of serial and parallel ports installed, whether the caps lock of a keyboard is turned on, hard disk controller status, option ROM memory addresses, and so on.

In the example of FIG. 2, the address range from '00000500h' to '0009FFFFh' of the virtual memory address space (210) is reserved for a program address space (216). The program area (216) is a range of addresses mapped to RAM that an operating system uses to execute routines of the operating system itself or to run computer software applications.

In the example of FIG. 2, the address range from '000A0000h' to '000BFFFFh' of the virtual memory address space (210) is reserved for a video address space (218). The video area (218) is a 128 KB block of addresses mapped to an accelerated graphics port ('AGP'). AGP is a high-speed computer bus for attaching a video adapter to a computer motherboard. AGP is primarily used to assist in the acceleration of 3D computer graphics.

In the example of FIG. 2, the address range from '000C0000h' to '000DFFFFh' of the virtual memory address space (210) is reserved for an option ROM shadow region (220). The option ROM shadow region (220) is 128 KB block of virtual memory address space mapped to RAM or ROM that is typically used to access option ROMs of expansion adapters. A memory management unit maps addresses in the option ROM shadow region to RAM or ROM depending on whether the system BIOS has shadowed the option ROM into RAM. Most often, the system BIOS copies the option ROMs into RAM and instructs the MMU to map the option ROM shadow region (220) to RAM because access times to RAM are generally faster than access times to ROM. When option ROM is shadowed in RAM, the system BIOS assigns one of four read/write states to addresses in the option ROM shadow region (220): read only, write only, read/write, or disabled. A memory management unit is responsible for enforcing these read/write states to protect the option ROM shadowed in RAM from alteration after an expansion adapter is initialized.

In the example of FIG. 2, the address range from '000E0000h' to '000EFFFFh' of the virtual memory address space (210) is reserved for an extended system BIOS data area (222). The extended system BIOS data area (222) is a 64 KB block in the virtual memory address space that is divided into four, 16 KB segments. The system BIOS can assign each segment independent read/write attributes so that each segment can be mapped either to RAM or to the BIOS ROM chip by a memory management unit. On systems that only support a 64 KB BIOS ROM chip, the extended system BIOS data area (222) is always mapped to RAM.

In the example of FIG. 2, the address range from '000F0000h' to '000FFFFFh' of the virtual memory address space (210) is reserved for a system BIOS area (224). The system BIOS area (224) is a 64 KB block of address that contains the system BIOS. By default, the system BIOS area (224) maps to the EEPROM chip implementing the system BIOS. This default mapping enables a processor to locate the address '000FFFF0h' containing the location of the first instruction for execution when processor initially turns on. After the system BIOS copies itself into RAM, the system BIOS remaps the system BIOS area (224) into the RAM containing the shadowed system BIOS.

In the example of FIG. 2, the address range from 'FFC00000h' to 'FFFFFBFFh' of the virtual memory address space (210) is reserved for memory-mapped input/output ('I/O') address space (226). Memory-mapped I/O address space (226) is the range of addresses in the virtual memory space that are mapped to registers of peripheral devices. For example, in a memory mapped display, each pixel or text character derives its data from a specific memory address in the virtual memory address space. Writing data to these memory addresses of the memory mapped display changes the information depicted on the display. Similarly, in a memory mapped network adapter, the registers for transmitting and receiving data are mapped to memory addresses in the virtual memory address space. Storing data in the memory addresses mapped to a register for transmitting data, sends the stored data through a data communications connection to another computer. Reading data in the memory addresses mapped to a register for receiving data obtains data sent through a data communications connection from another computer.

In the example of FIG. 2, the address range from 'FFFFFC00h' to 'FFFFFFFFh' of the virtual memory address space (210) is reserved for an extended BIOS data area (228). The extended BIOS data area (228) is the range of memory address in the virtual memory address space that maps to RAM for supplementing the storage available in the BIOS data area (214). The extended BIOS data area (228) consists of the top 1 KB of system RAM. Computer programs locate the beginning of the extended BIOS data area (228) with a BIOS function call using interrupt 15h.

The example of FIG. 2 also includes expansion adapter (200). The expansion adapter (200) is computer hardware that expands the capabilities of a computer by providing the circuitry to support other computer devices. Example expansion adapters include display adapters, network adapters, storage adapters, and so on. The expansion adapter (200) includes option ROM (202), which is firmware for implementing operations specific to expansion adapter (200). In the example of FIG. 2, the option ROM (202) includes initialization code (204) and runtime code (206). Initialization code (204) represents the computer program instructions that initialize an expansion adapter and prepare the expansion adapter for runtime operation. Initialization code (204) may operate to perform the POST of the expansion adapter and map the interrupt service routines to an interrupt vector table in RAM. Runtime code (206) is computer program instructions that provide the interrupt service routines and BIOS routines after the expansion adapter and other components of the computer have been initialized. In the example of FIG. 2, the expansion adapter (200) also includes registers (203). Registers (203) are hardware registers that store input data and output data for the expansion adapter (200).

The example of FIG. 2 includes page table (104) that maps addresses between the virtual memory address space (210) and the physical address space. The page table (104) in the example of FIG. 2 associates a frame number (208) and a page number (209). Frame number (208) identifies a 4 KB block of address space in the physical address space. Page number (209) identifies a 4 KB block of address space in the virtual memory address space.

In the example of FIG. 2, the page table (104) maps the initialization code (204) and runtime code (206) of the option ROM (202) into the 128 KB option ROM shadow region (220). Although the example of FIG. 2 depicts initialization code (204) and runtime code (206) of the option ROM (202) installed on the expansion adapter (200), such a depiction is for explanation and not limitation. Initialization code (204) and runtime code (206) of the option ROM (202) may also be shadowed in RAM (not shown). When the initialization code (204) and runtime code (206) is shadowed in RAM, the page table (104) maps addresses in the option ROM shadow region (220) of FIG. 2 to physical addresses in RAM containing the shadowed initialization code and the shadowed runtime code.

In the example of FIG. 2, the page table (104) also maps registers (203) to the memory-mapped I/O address space (226). A processor therefore may access registers (203) of the expansion adapter (200) by reading and writing to memory addresses in the virtual memory address space that are mapped to registers (203). Although the example of FIG. 2 depicts registers (203) mapped to the memory-mapped I/O address space (226), such a depiction is for explanation and not for limitation. Registers (203) may also be mapped into a processor's I/O address space (not shown). Utilizing a processor's input/output address space is referred to as 'port-mapped I/O.' Port-mapped I/O uses a special class of processor instructions dedicated to performing I/O. Processors typically implement I/O address space by an extra I/O pin on the processor's physical interface or an entire bus dedicated to I/O addresses.

Figure 3:
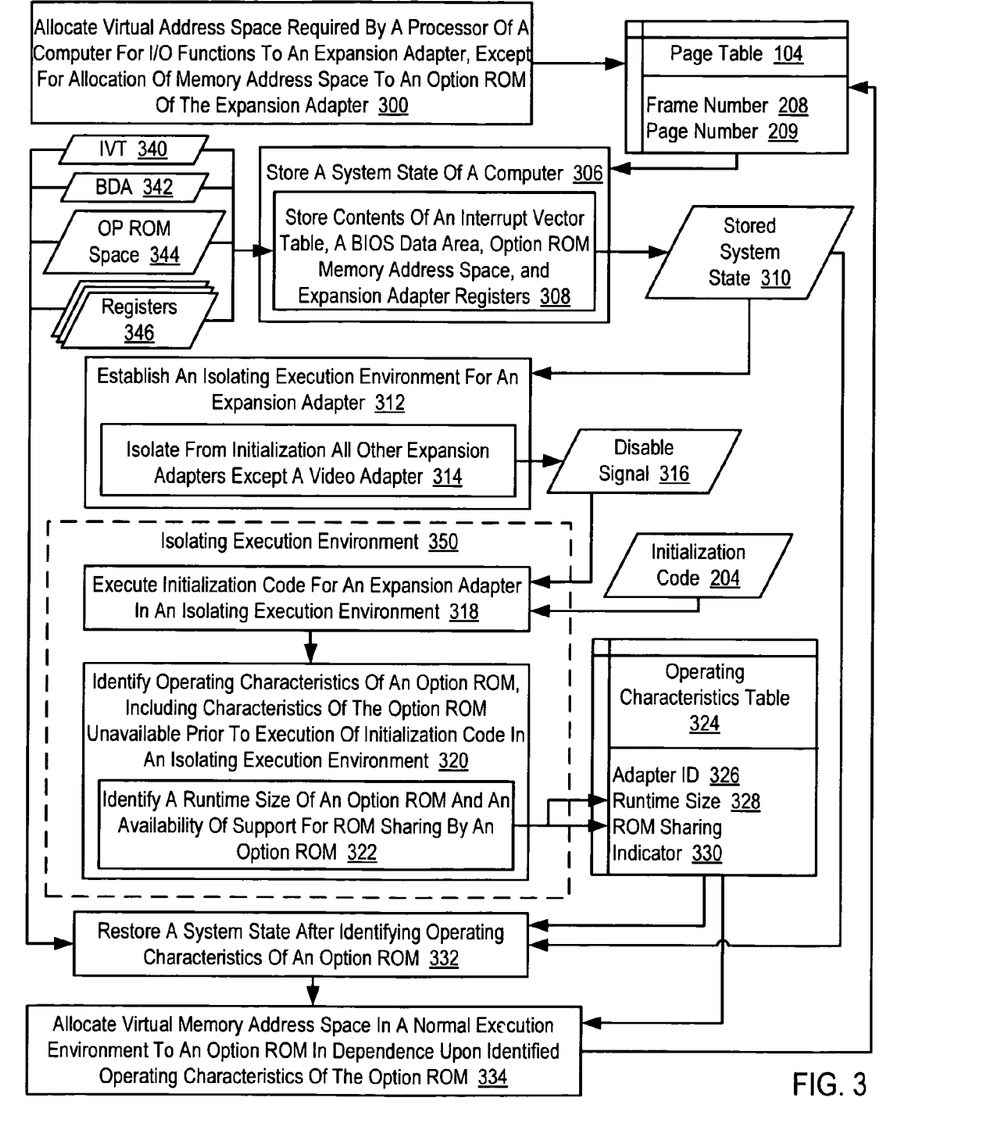
FIG. 3 sets forth an exemplary method of option ROM characterization according to embodiments of the present invention.

For further explanation, FIG. 3 sets forth an exemplary method of option ROM characterization according to embodiments of the present invention. The method of FIG. 3 includes allocating (300) virtual address space required by a processor of a computer for input/output functions to an expansion adapter without allocation of virtual memory address space to the option ROM of the expansion adapter. An option ROM characterization module may allocate (300) virtual address space required by a processor of a computer for input/output functions to an expansion adapter by mapping the required address space of an expansion adapter to the virtual address space using a page table (104). In the example method of FIG. 3, page table (104) associates a frame number (208) and page number (209). Frame number (208) identifies a block of addresses in the physical address space. Page number (209) identifies a block of addresses in the virtual memory address space that correspond to a frame number (208). The page table (104) therefore provides a map between addresses in the virtual memory address space and addresses in the physical address space.

To obtain the size of the address space required by an expansion adapter for I/O with a processor, an option ROM characterization module may identify the location of the expansion adapter on an expansion adapter bus and read a register of the expansion adapter containing the address space size requirements. An option ROM allocation module may identify an expansion adapter's location and read the expansion adapter's registers using standard BIOS functions described in BIOS specifications such as, for example, the BIOS Boot Specification developed by the Compaq Computer Corporation, Phoenix Technologies Ltd., and the Intel Corporation, the Peripheral Component Interconnect ('PCI') BIOS Specification published by the PCI Special Interest Group, and the POST Memory Manager Specification developed by Phoenix Technologies Ltd. and the Intel Corporation. BIOS functions useful in option ROM characterization according to embodiments of the present invention may include, for example, the FIND_PCI_CLASS_CODE, WRITE_CONFIG_BYTE, and READ_CONFIG_BYTE.

FIND_PCI_CLASS_CODE is a function described in the PCI BIOS Specification that identifies an expansion bus number, a device number, and a function number of an expansion adapter on a PCI bus. The expansion bus number is a number in the range from '0' to '255' that uniquely identifies the PCI bus to which a PCI expansion adapter physically connects. The device number is a number in the range from '0' to '31' that uniquely selects a PCI expansion adapter on a PCI bus. The function number is a number in the range from '0' to '7' that uniquely selects a function within a multi-function PCI expansion adapter. Using an expansion bus number, a device number, and a function number of a PCI expansion adapter, an option ROM allocation module can identify the location of a PCI expansion adapter. The term 'PCI expansion adapter' refers to an expansion adapter conforming to the PCI Bus Specification published by the PCI Special Interest Group.

WRITE_CONFIG_BYTE and READ_CONFIG_BYTE are functions also described in the PCI BIOS Specification that respectively write to and read from registers in the PCI configuration header of a PCI expansion adapter. The PCI Configuration header is a block of registers that allow system BIOS to identify and control a PCI expansion adapter. In particular, the PCI Configuration includes several base address registers useful to determine and allocate the type, amount, and location of address space that the PCI expansion adapter requires. Using the WRITE_CONFIG_BYTE and READ_CONFIG_BYTE, an option ROM characterization module may query a PCI expansion adapter regarding the required address space by writing '1's in each bit of a base address register and then reading back the result from the same base address register. A PCI expansion adapter will return '0's in several of the least significant bits of the base address register. The remaining most significant bits of the base address register specify the size of address space required. For example, after writing '11111111111111111111111111111111' to a base address register in a PCI configuration header, reading '11111111111111110000000000000000' from the same register indicates that the PCI expansion adapter requires 64 KB of memory address space. Although BIOS functions described above useful in option ROM characterization are describe with reference to the PCI Bus standard, such description is for explanation and not for limitation. BIOS functions of other expansion bus standards such as, for example, Industry Standard Architecture ('ISA'), Micro Channel Architecture ('MCA'), or Accelerated Graphics Port ('AGP') may also be useful in option ROM characterization according to embodiments of the present invention.

To ensure that an option ROM of an expansion adapter is not allocated into the virtual memory address space, allocating (300) virtual address space required by a processor of a computer for input/output functions to an expansion adapter without allocation of virtual memory address space to the option ROM of the expansion adapter may include disabling option ROMs for expansion adapters. Disabling option ROMs for expansion adapter is specific to a particular expansion adapter bus standard. For example, in the PCI Bus Specification published by the PCI Special Interest Group, an option ROM characterization module may disable option ROMs for expansion adapter by writing a '0' in the least significant bit of the base address register at an offset of 30h bytes from the beginning of the PCI configuration header.

The method of FIG. 3 also includes storing (306) a system state of the computer prior to establishing an isolating execution environment (350). Stored system state (310) represents the data useful in returning a computer system to an original state that existed at the time of storage (306). The state of a computer system is represented by the contents of computer storage such as, for example, RAM, ROM, registers, and so on. In the example of FIG. 3, storing (306) a system state of the computer therefore includes storing (308) contents (340, 342, 344, 346) of an interrupt vector table, a BIOS data area, option ROM memory address space, and expansion adapter registers. In the example of FIG. 3, interrupt vector table ('IVT') (340) represents the contents of the interrupt vector table. BIOS data area ('BDA') (342) represents the contents of the BIOS data area. Option ROM memory address space ('OP ROM Space') (344) represents the contents of the option ROM memory address space. The expansion adapter registers (346) represent the contents of the registers of an allocated expansion adapter. An option ROM characterization module stores (308) the contents (340, 342, 344, 346) of the interrupt vector table, the BIOS data area, the option ROM memory address space, and expansion adapter registers by copying the contents (340, 342, 344, 346) of such storage locations to other unused storage locations in RAM. An option ROM characterization module may obtain these other unused storage locations by using the 'pmmAllocate' function described in the POST Memory Manager Specification developed by Phoenix Technologies Ltd. and the Intel Corporation.

The method of FIG. 3 also includes establishing (312) an isolating execution environment (350) for an expansion adapter of a computer. The expansion adapter has an option ROM containing initialization code for the adapter. The isolating execution environment (350) is an environment for initializing an expansion adapter that limits interference from other expansion adapters in the system. Unintended interference from other expansion adapters may occur due to interactions between adapters such as, for example, ROM sharing or one adapter initializing another adapter. To limit interference from other expansion adapters, an option ROM allocation module may only initialize one expansion adapter in an isolating execution environment. By establishing an isolating execution environment, an option ROM characterization module obtains the most accurate runtime operating characteristics of the option ROM.

In the example of FIG. 3, establishing (312) an isolating execution environment (350) for an expansion adapter of a computer includes isolating (314) from initialization all other expansion adapters in the computer except a video adapter. An option ROM characterization module does not isolate the video adapter from initialization because the adapter initialized in the isolating execution environment may contain data for display to a computer screen. In addition, the video adapter typically does not produce unintended interference because the video adapter responds to traditional video adapter address ranges that are different from the address ranges assigned to option ROMs. Video adapter address ranges typically extend from 'A0000h' to 'BFFFFh' in the virtual memory address space, while option ROM address ranges extend from 'C0000h' to 'DFFFFh' in the virtual memory address space.

In the example of FIG. 3, an option ROM characterization module may isolate (314) other expansion adapters from initialization by disabling the other expansion adapters. The disable signal (316) represents the data asserted by an option ROM characterization module to the other adapters for disabling the other adapters in a computer system. The value of the disable signal (316) is specific to a particular expansion adapter bus standard. For example, in the PCI Bus Specification published by the PCI Special Interest Group, the disable signal (316) represents asserting a 'RST#' signal that returns the registers of the PCI configuration header to their initial power-on state, effectively removing the PCI expansion adapter from the virtual address space. Once removed from the virtual address space, a PCI expansion adapter appears invisible to the computer system and no unintended interference with the initializing expansion adapter can occur.

After an option ROM characterization module establishes an isolating execution environment to limit interference between expansion adapters, the option ROM characterization module initializes a single expansion adapter to identify operating characteristics of the option ROM of the expansion adapter. The method of FIG. 3 therefore includes executing (318) the initialization code (204) for an expansion adapter in the isolating execution environment (350). The initialization code (204) represents the computer program instructions that initialize an expansion adapter and prepare the expansion adapter for runtime operation. An option ROM characterization module may execute (318) the initialization code (204) by enabling the option ROM and mapping the option ROM to an unoccupied area of the virtual memory address space. Such enabling and mapping of the option ROM may occur because the option ROM characterization module does not allocate the virtual memory address space to the option ROM during the initial allocating (300) of virtual address space to the expansion adapter. After mapping the option ROM to the virtual memory address space, the option ROM characterization module may shadow the option ROM into RAM. Typically, the shadowed option ROM is mapped to address ranges 'C0000h' to 'DFFFFh' in the virtual memory address space also referred to as the option ROM shadow region.

After shadowing the option ROM into RAM, the option ROM characterization module transfers processor control to the initialization code (204) of the option ROM by jumping to the location of the first instruction for execution of the option ROM and placing a return location for the next instruction of the option ROM characterization module on a processor's execution stack. The location of the first instruction for execution of initialization code (204) of the option ROM is specific to a particular expansion adapter bus standard. For example, in the PCI Bus Specification published by the PCI Special Interest Group, the location of the first instruction for execution of the initialization code (204) may be located at a 3h byte offset from the beginning of a PCI Expansion ROM header.

The PCI Expansion ROM header is a data block that allow a system BIOS to identify and execute a PCI option ROM. An option ROM characterization module may locate a PCI Expansion ROM header by scanning the 'C0000h' to 'DFFFFh' address range for a value of '55AAh' at every 2 KB boundary.

The method of FIG. 3 includes identifying (320) operating characteristics of the option ROM that includes characteristics of the option ROM unavailable prior to execution of the initialization code (204) in the isolating execution environment (350). Operating characteristics are metrics that describe an option ROM such as, for example, runtime size and the availability of support for ROM sharing. An option ROM characterization module stores operating characteristics in an operating characteristics table (324). The operating characteristics table (324) associates an adapter identifier (326) with a runtime size (328) and ROM sharing indicator (330). The adapter identifier (326) represents the particular expansion adapter described by the operating characteristic metrics. The runtime size (328) represents the size of the memory address space required to contain the runtime code of an option ROM. The ROM sharing indicator (330) represents whether a particular option ROM supports sharing a single instance of runtime code among two or more instances of an expansion adapter. When an option ROM does not support ROM sharing, identical expansion adapters installed in the same computer system will require separate instances of runtime code mapped into the virtual memory space. When an option ROM supports ROM sharing, however, the same runtime code mapped into the virtual memory space can operate both expansion adapters.

In the method of FIG. 3, identifying (320) operating characteristics of an option ROM that include characteristics of the option ROM unavailable prior to execution of the initialization code (204) in the isolating execution environment (350) includes identifying (322) a runtime size (328) of an option ROM and the availability of support for ROM sharing (330) by an option ROM. ROM sharing is implemented in the option ROM code itself once the option ROM code is executed. An option ROM characterization module may therefore identify support for ROM sharing by examining the option ROM code and data areas modified by the option ROM such as the interrupt vector table, BIOS data area, and the extended BIOS data area. An option ROM characterization module may identify the runtime size (328) of an option ROM by reading the size field contained in an option ROM. The location of the size field in an option ROM is specific to a particular expansion adapter bus standard. For example, in the PCI Bus Specification published by the PCI Special Interest Group, the size field may be located in the initialization size field at a 2h byte offset from the beginning of a PCI Expansion ROM header. Before a processor executes the initialization code of a PCI option ROM, the initialization size field contains a value that represents the total size of the initialization code and the runtime code of an option ROM in units of 512 bytes. During execution of the initialization code, the initialization code adjusts the value of the initialization size field to indicate only the size of the runtime code. By reading the initialization size field, an option ROM characterization module may obtain the runtime size (328) of the option ROM.

The method of FIG. 3 also includes restoring (332) the system state (310) after identifying the operating characteristics of the option ROM. Restoring (332) the system state (310) returns the computer system to the original state that existed at the time of storage (306). In the example of FIG. 3, an option ROM characterization module may restore (332) the system state by copying the stored system state (310) back into the respective storage locations from which the stored system state (310) were originally copied. That is, an option ROM characterization module may copy the stored system state (310) into the interrupt vector table, the BIOS data area, the option ROM memory address space, and the expansion adapter registers.

In the method of FIG. 3, an option ROM characterization module may also restore (332) the system state (310) by enabling any of the other expansion adapters previously isolated (314) using disable signal (316). Enabling the previously isolated expansion adapters occurs in a manner specific to a particular expansion adapter bus standard. For example, in the PCI Bus Specification published by the PCI Special Interest Group, enabling the previously isolated expansion adapters may be carried out by deasserting a 'RST#' signal.

Readers will notice that after restoring (332) the system state (310) in the method of FIG. 3, the option ROM characterization module has identified the operating characteristics of an option ROM of only one expansion adapter. The option ROM characterization module may characterize the option ROMs of other expansion adapters by looping to, again, establish (312) an isolating execution environment for the next expansion adapter containing option ROM, execute (318) initialization code for the next expansion adapter in the isolating execution environment, identify (320) operating characteristics of the option ROM, and restore (332) a system state after identifying operating characteristics of the option ROM. Characterizing option ROMs of other expansion adapters is for example only and not for limitation. An option ROM characterization module operating according to embodiments of the present invention may characterize any number of option ROMs installed on any number of expansion adapters.

The method of FIG. 3 also includes allocating (334) virtual memory address space in a normal execution environment of the computer to the option ROM of the expansion adapter in dependence upon the identified operating characteristics of the option ROM. A normal execution environment is an environment with none of the expansion adapter isolated from initialization. In a normal execution environment, there is, therefore, no restriction on the number of expansion adapters for which a processor executes initialization code. In a normal execution environment, the system BIOS initializes expansion adapters one after another until the system BIOS loads the operating system. An option ROM characterization module may allocate (334) virtual memory address space in a normal execution environment to an option ROM by mapping the option ROM shadow region in the virtual memory address space to the physical address space of the RAM containing the option ROM using the page table (104). An option ROM characterization module may calculate the number of pages in the virtual memory address space and the number of frames in physical address space to map using page table (104) by dividing the value of runtime size (328) of an option ROM for an expansion adapter represented by adapter ID (326) by the page size of the pages in the virtual memory address space. Consider, for example, an option ROM having a runtime size of 8 KB and a page in virtual memory having a page size of 4 KB. The number of pages in virtual memory necessary to map the runtime code of such an option ROM into the virtual memory address space may be calculated as follows:

$$N = R \div S = 8 \text{ KB} \div 4 \text{ KB} = 2 \text{ pages}$$

where N is the number of pages and frames required to map the runtime code into the virtual memory address space, where R is value of the runtime size (328) of the option ROM, and where S is the page size of the pages in the virtual memory address space. An option ROM characterization module may also calculate the number of pages in the virtual memory address space and the number of frames in physical address space to map using page table (104) by dividing the total size of all option ROMs supporting option ROM sharing for expansion adapters by the number of expansion adapters sharing an option ROM instance divided by the page size of the pages in the virtual memory address space. Consider, for example, four identical expansion adapters with option ROMs that support option ROM sharing with a total option ROM size of 48 KB and a page in virtual memory having a page size of 4 KB. The number of pages in virtual memory necessary to map the runtime code of the option ROMs of the four expansion adapters into the virtual memory address space may be calculated as follows:

$$N = T \div A \div S = 48 \text{ KB} \div 4 \text{ adapters} \div 4 \text{ KB} = 3 \text{ pages}$$

where N is the number of pages and frames required to map the runtime code of the option ROMs of the expansion adapters into the virtual memory address space, where T is the total size of all option ROMs supporting option ROM sharing for expansion adapters, where A is the number of expansion adapters sharing an option ROM instance, and where S is the page size of the pages in the virtual memory address space.

Because the option ROM for some expansion adapters may request allocation (334) to certain address ranges in the virtual memory address space during initialization, an option ROM characterization module may not be able to allocate (334) memory to all the option ROMs in contiguous blocks such as, for example, allocating addresses from 'C0000h' to 'C1FFFh' to a first option ROM, allocating addresses from 'C2000h' to 'C3FFFh' to a second option ROM, allocating addresses from 'C4000h' to 'C5FFFh' to a third option ROM, allocating addresses from 'C6000h' to 'C7FFFh' to a fourth option ROM, and so on. Option ROMs that request allocation to certain address ranges may create holes in the mapped space of the virtual memory address space. Consider, for example, a first option ROM that requests mapping to address range 'D0000h' to 'D2FFFh,' and a second option ROM module that requests mapping to address range 'DE000h' to 'DFFFFh.' Such mapping requests by the first option ROM and the second option ROM create holes in the option ROM shadow region at the address ranges 'C0000h' to 'CFFFFh' and 'D3000h' to DDFFFh.' When option ROM mapping requests create holes in the option ROM shadow region of the virtual memory address space, an option ROM characterization module may implement one or more conventional sorting techniques to efficiently map the remaining option ROM into the option ROM shadowing region. Such conventional techniques may include, for example, First Fit, Last Fit, Next Fit, Best Fit, Worst Fit, Almost Worst Fit, and Sorted Best Fit.

The First Fit sorting technique maps an option ROM to the lowest unmapped address range in the option ROM shadow region that has space for the option ROM. The Last Fit sorting technique maps an option ROM to the highest unmapped address range in the option ROM shadow region that has space for the option ROM. The Next Fit sorting technique maps an option ROM to the next unmapped address range in the option ROM shadow region that is higher than the address range mapped to option ROM immediately before the current option ROM and that has space for the option ROM. The Best Fit sorting technique maps an option ROM to the smallest unmapped address range in the option ROM shadow region that has space for the option ROM. The Worst Fit sorting technique maps an option ROM to the largest unmapped address range in the option ROM shadow region that has space for the option ROM. The Almost Worst Fit sorting technique maps an option ROM to the second smallest unmapped address range in the option ROM shadow region that has space for the option ROM. The Sorted Best Fit sorting technique maps an option ROM to the smallest unmapped address range in the option ROM shadow region that has space for the option ROM after sorting the option ROMs to be mapped according to a particular operating characteristic such as, for example, runtime size or the availability of support for ROM sharing.

In the example of FIG. 3, readers will notice various examples and descriptions of option ROM characterization according to embodiments of the present invention are describe with reference to the PCI Bus and related specifications. Such examples and descriptions are for explanation only and not for limitation. Option ROM characterization according to embodiments of the present invention may also be carried out with reference to any expansion adapter bus and related specification as will occur to those of skill of the art. Such expansion adapter buses may include, for example, Industry Standard Architecture ('ISA'), Extended Industry Standard Architecture ('EISA'), Video Electronics Standards Association Local Bus ('VLB'), Micro Channel Architecture ('MCA'), Accelerated Graphics Port ('AGP'), and so on.

Exemplary embodiments of the present invention are described largely in the context of a fully functional computer system for option ROM characterization. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of option ROM characterization, the method comprising:
  establishing an isolating execution environment for an expansion adapter of a computer, the adapter having an option ROM containing initialization code for the adapter, wherein establishing the isolating execution environment for the expansion adapter further comprises isolating from initialization all other expansion adapters in the computer except a video adapter, including disabling the other expansion adapters by using a disable signal that has a value specific to a particular expansion adapter bus standard;

executing the initialization code for the expansion adapter in the isolating execution environment by enabling the option ROM and mapping the option ROM to an unoccupied area of the virtual memory address space, and shadowing the option ROM into RAM;

identifying operating characteristics of the option ROM, including characteristics of the option ROM unavailable prior to execution of the initialization code in the isolating execution environment, wherein identifying operating characteristics of the option ROM, including characteristics of the option ROM unavailable prior to execution of the initialization code in the isolating execution environment, further comprises identifying a runtime size of the option ROM and an availability of support for ROM sharing by the option ROM;

storing a system state of the computer prior to establishing the isolating execution environment, wherein storing the system state of the computer further comprises storing contents of an interrupt vector table, a BIOS data area, option ROM memory address space, and expansion adapter registers;

restoring the system state after identifying the operating characteristics of the option ROM;

allocating virtual address space required by a processor of the computer for input/output functions to the expansion adapter, except for allocation of virtual memory address space to the option ROM of the expansion adapter; and allocating virtual memory address space in a normal execution environment of the computer to the option ROM of the expansion adapter in dependence upon the identified operating characteristics of the option ROM.

* * * * *